No. 607,550.  Patented July 19, 1898.
D. W. PORTEOUS.
ACTUATING MECHANISM FOR STATION INDICATORS.
(Application filed Dec. 13, 1897.)
(No Model.)
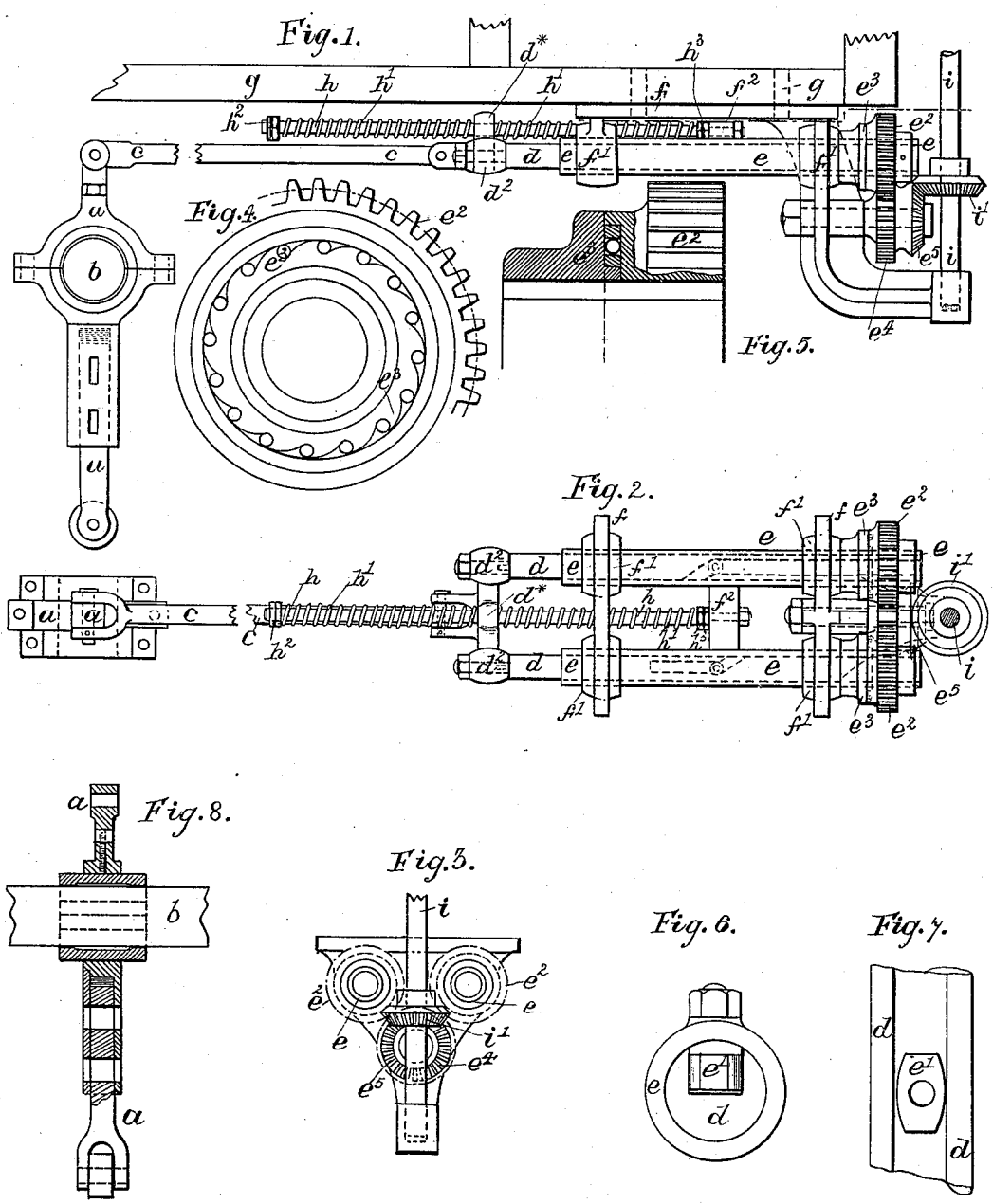

UNITED STATES PATENT OFFICE.

DUNDAS W. PORTEOUS, OF LONDON, ENGLAND.

ACTUATING MECHANISM FOR STATION-INDICATORS.

SPECIFICATION forming part of Letters Patent No. 607,550, dated July 19, 1898.

Application filed December 13, 1897. Serial No. 661,650. (No model.) Patented in England July 21, 1896, No. 16,161.

*To all whom it may concern:*

Be it known that I, DUNDAS WILLIAM PORTEOUS, a subject of the Queen of Great Britain, residing at London, England, have invented certain new and useful Improvements in Apparatus for Communicating Motion to Station-Indicators in Railway-Carriages, (the same having been patented in Great Britain July 21, 1896, No. 16,161,) of which the following is a full, clear, and exact description.

The invention has for its object improvements in apparatus for communicating motion to station-indicators in railway-carriages, and relates to an improved and simple arrangement of means whereby the prime mover or actuating-lever is caused to communicate only the exact amount of motion required to operate the indicator at each contact of the actuating-lever with the fixed cam or incline.

I will describe my invention by referring to the accompanying drawings, in which—

Figure 1 is a side elevation, and Fig. 2 is a plan of apparatus constructed according to my invention. Fig. 3 is an end view of parts. Fig. 4 is a sectional side view, and Fig. 5 is a cross-sectional view, of one of the toothed wheels. Fig. 6 is an end view of one of the operating-rods and cylinders. Fig. 7 is a plan of one of the rods, showing the groove and operating-pin therein; and Fig. 8 is a vertical section of the actuating-lever.

In all the figures like parts are indicated by similar letters of reference.

$a$ is the actuating-lever, which I construct and mount on the axle $b$ of a pair of the carriage running-wheels, as shown at Figs. 1 and 8. The upper end of this lever is connected by a link $c$ with a cross-head $d^2$, connecting together two grooved rods $d$, fitting and capable of moving to and fro within cylinders $e$, each provided with a swiveling stud or projection $e'$, entering the grooves of said rods $d$. These cylinders $e$ are mounted within bearings $f'$ on a bracket or frame $f$, fixed to the under carriage $g$, so as to be capable of revolving, but not of moving endwise therein. These rods $d$ have their grooves $d'$ formed partly longitudinal therewith and partly inclined around the same, and the groove of one rod is the reverse of the other, the inclined portion of the groove $d'$ of one rod starting at the same cross-line as the other, but proceeding in opposite directions—that is to say, where the one rod has its groove inclined the other has it longitudinal, and vice versa.

The normal position of the parts is with the actuating-lever $a$ vertical and the studs or projections $e'$ from the cylinders lying in the grooves of the rods $d$ at the point of junction of the inclined with the longitudinal parts of said grooves, so that if such rods $d$ are moved in either direction one only of such rods will give a partial rotary motion to its cylinder $e$, while the other rod $d$ will keep its cylinder still, and in order that the parts may after each operation be brought back to their normal position in readiness for a fresh action I pass through a projection $d^*$ on the cross-head $d^2$ a reaction-rod $h$, one end of which is fixed to a suitable block or fixture $f^2$ on the frame $f$, and I place around such reaction-rod, on each side of the cross-head, a spring $h'$, acting against such cross-head, and one of such springs also acts against a fixed nut or stop $h^2$ at the outer end of the rod $h$ and the other against a nut $h^3$.

In order to communicate the rotary motion of the cylinders $e$ to the vertical shaft $i$, giving motion to the indicators, I mount on the end of each cylinder $e$ a toothed wheel $e^2$, driven by a clutch $e^3$, such as that represented at Figs. 4 and 5, whereby each of such wheels $e^2$ is driven only in one direction by its carrying-cylinder $e$ and is capable of rotating freely thereon in the contrary direction. These toothed wheels $e^2$ gear with a third wheel $e^4$, to which is also fixed a bevel-pinion $e^5$, gearing with another bevel-pinion $i'$, fixed on the lower end of the vertical shaft $i$. This vertical shaft $i$ communicates motion by suitable gearing to a horizontal shaft running along the top of the carriage, and such horizontal shaft communicates motion to the indicators by means of worms and worm-wheels or other gearing.

I have not thought it necessary to show in the drawings the above-described arrangement for communicating motion from the vertical shaft $i$ to the indicators, as such will be readily understood from the description given and forms no part of the present invention, as it was described in Robertson's English Patent, No. 13,045 of the year 1894. Thus when the actuating-lever $a$ is moved in one direction it will, by one of the grooved rods $d$ and cylinders $e$, give motion to the gearing in one direction, the wheel $e^2$ on one of said cylinders being driven by its clutch $e^3$, fixed on the cylinder $e$, while the toothed wheel $e^2$ on the other cylinder $e$ runs loosely on its clutch, and vice versa. After each operation the reaction-rod $h$ and springs $h'$ bring the parts to their normal position in readiness for a fresh operation.

Having fully described my invention, what I claim, and desire to secure by Letters Patent, is—

1. In apparatus for communicating motion to station-indicators in railway-carriages, the combination with an actuating-lever, of a pair of grooved rods capable of being moved endwise by said lever within rotatable tubes provided with projections fitting the grooves of said rods, toothed wheels mounted on and driven by clutches fixed on said tubes so as to be moved in one direction and slip in the contrary direction, said toothed wheels giving motion to the indicator mechanism by suitable gearing, substantially as herein shown and described.

2. In apparatus for communicating motion to station-indicators in railway-carriages, the combination of an actuating-lever, connecting-link, cross-head connecting together two grooved rods, rotatable tubes fitting around such grooved rods and provided with projections fitting the grooves of said rods, toothed wheels mounted on, and driven by clutches on, said rotatable tubes gearing with an intermediate toothed wheel mounted on an axle having a bevel-pinion gearing with a bevel-pinion mounted at the lower end of a vertical shaft, substantially as herein shown and described and for the purpose stated.

3. In apparatus for communicating motion to station-indicators in railway-carriages, the combination of two rods actuated by a lever, each rod having a groove formed partly longitudinal therewith and partly inclined around the same, the groove in one rod being the reverse of that in the other rod, with two rotatable tubes provided with projections fitting the grooves of said rods, and gearing for communicating motion from said tubes to an indicator-operating shaft, substantially as herein shown and described and for the purpose stated.

In testimony whereof I affix my signature in presence of two witnesses.

D. W. PORTEOUS.

Witnesses:
CLAUDE K. MILLS,
H. SEYMOUR MILLS.